(12) United States Patent
Choi et al.

(10) Patent No.: US 6,416,438 B1
(45) Date of Patent: Jul. 9, 2002

(54) TRANSMITTING UNIT

(75) Inventors: ByongChol Choi, 73-4 Sharim-dong, Changwon (KR); WanDoo Kim, Taejon (KR)

(73) Assignees: ByongChol Choi, Changwon; Korea Institute of Machinery and Materials, Taejon, both of (KR)

( * ) Notice: Subject to any disclaimer, the term of this patent is extended or adjusted under 35 U.S.C. 154(b) by 0 days.

(21) Appl. No.: 09/599,899

(22) Filed: Jun. 23, 2000

Related U.S. Application Data

(63) Continuation-in-part of application No. 09/343,632, filed on Jun. 30, 1999, now abandoned.

(30) Foreign Application Priority Data

Apr. 30, 1999 (KR) .............................................. 99-7601

(51) Int. Cl.[7] ................................................. F16H 3/70
(52) U.S. Cl. ........................ 475/170; 475/168; 475/179
(58) Field of Search ................................ 475/162, 168, 475/170, 178, 179, 196; 74/116; 476/36

(56) References Cited

U.S. PATENT DOCUMENTS

| | | | | |
|---|---|---|---|---|
| 3,468,175 A | * | 9/1969 | Rabek | .......................... 74/63 |
| 4,620,456 A | * | 11/1986 | Distin et al. | ............ 475/168 X |
| 4,736,654 A | | 4/1988 | Ren | |
| 4,798,104 A | * | 1/1989 | Chen et al. | ................. 475/168 |
| 5,061,227 A | * | 10/1991 | Fickelscher | ................. 475/170 |
| 5,145,468 A | * | 9/1992 | Ngabhusan | ................. 475/170 |

FOREIGN PATENT DOCUMENTS

| | | | |
|---|---|---|---|
| EP | 0408314 | 1/1991 | |
| GB | 1204466 | * 9/1970 | ................. 475/168 |
| JP | 39146 | 1/1991 | |
| JP | 4-202296 | 7/1992 | |
| JP | 6-241283 | 8/1994 | |
| JP | 7-243486 | 9/1995 | |

* cited by examiner

Primary Examiner—Charles A Marmor
Assistant Examiner—Ha Ho
(74) Attorney, Agent, or Firm—Notaro & Michalos P.C.

(57) ABSTRACT

A transmitting unit which uses bearings and the eccentric principle to reduce or increase the rotational speed. An eccentric portion is integrally formed with an input shaft, and a bearing is assembled along the outer periphery of the eccentric portion. The bearing is eccentrically moved when the input shaft is rotated. The bearing is surrounded by an integrally formed transmitting race, and plurality of radial holes are formed in the transmitting race. The same plurality of transmitting rods are respectively inserted into the radial holes of the transmitting race. An integrally formed outer race surrounds the outer periphery of the transmitting race, and has a plurality of wave grooves on the inner periphery thereof. The same plurality of balls are respectively provided between the transmitting rods and the wave grooves. According to the transmitting unit, the strength of the unit can increase as the unit can be minimized, while the noise and the vibration of the unit can decrease.

9 Claims, 3 Drawing Sheets

TRANSMITTING UNIT

CROSS-REFERENCE OF RELATED APPLICATION

This application is a Continuation-in-part application of "COMPACT, STRONG AND HIGH PRECISION REDUCTION GEAR", Ser. No. 09/343,632, filed on Jun. 30, 1999, now abandoned the contents of which are herein incorporated by reference in their entirety. This application also relies for priority upon Korea Utility Model Application No. 99-7601 filed on Apr. 30, 1999, the contents of which are herein incorporated by reference in their entirety.

BACKGROUND OF THE INVENTION

1. Field of the Invention

The present invention relates to a transmitting unit, and more particularly to a transmitting unit using bearings and the eccentric principle to reduce or increase the rotational speed.

2. Description of the Prior Art

Conventionally, a transmitting unit reducing the rotational speed, which has been industrially used, reduces or increases the rotational speed of the input shaft mainly by disposing gears. The transmitting unit mainly uses worm gears or epicyclical trains, and examples of the transmitting unit are disclosed in Japanese Patent Laid-open No. Sho 60-91043 and Japanese Patent Laid-open No. Sho 63-214542 for further details.

However, since the aforementioned transmitting unit uses relative movement of meshed gears, much power is lost and much noise and vibration is generated. Beyond that, the transmitting unit is mainly used for heavy load. Furthermore, the structure of the transmitting unit is so complicated that it is hard to install the unit, and an output shaft is reversibly rotated when an input shaft is rotated.

In order to settle the aforementioned problems, U.S. Pat. No. 4,736,654 allowed to Zhu S. Ren and entitled "transmitting unit" discloses a transmitting unit reducing speed that uses bearings.

According to the transmitting unit of Ren, an eccentric sleeve and bearings are rotated to push transmitting rods, when an input shaft is rotated. In addition, rolling members that are linearly moved in a radial direction on the outer sides of the transmitting rods are moved along the waves of an outer race.

By the aforementioned operation, the rotational speed of an output shaft mounted to the transmitting race is reduced, and the output shaft is rotated in the same rotational direction as that of the input shaft.

However, the structure of the transmitting unit has a disadvantage in that it is complicated and many parts are required to assemble the transmitting unit. Furthermore, the transmitting unit cannot be easily manufactured. Namely, the transmitting unit is rather an ideal unit.

SUMMARY OF THE INVENTION

The present invention has been made to solve the aforementioned problem, and accordingly it is an object of the present invention to provide a transmitting unit that has an integrally formed transmitting race, an integrally formed outer race, and an input shaft in which an eccentric portion is integrally formed therewith, without using a separate eccentric sleeve so as to increase the strength of the unit and minimize the unit.

It is another object of the present invention to provide a transmitting unit that is precisely maintained and decreases the noise and the vibration thereof during the operation of the unit.

In order to achieve the aforementioned objects of the present invention, the present invention provides a transmitting unit comprising an input shaft driven by a driving device; a sleeve driven together with the input shaft when the input shaft is driven and having a first concentric portion, a second concentric portion, and an eccentric portion; a first bearing assembled along the outer periphery of the first concentric portion; a second bearing assembled along the outer periphery of the second concentric portion; a third bearing assembled along the outer periphery of the eccentric portion and strangely enough moving when the input shaft is driven; an integrally formed transmitting race having a first flange surrounding the outer periphery of the first bearing, a second flange surrounding the outer periphery of the second bearing, and a third flange surrounding the outer periphery of the third bearing and integrally formed with the first and second flanges, the third flange having a plurality of radial holes spaced apart at a predetermined distance; the same plurality of transmitting rods respectively inserted into the radial holes of the third flange of the transmitting race; an integrally formed outer race located out of the transmitting race and having a plurality of wave grooves on the inner periphery thereof; and the same plurality of balls respectively provided between the transmitting rods and the wave grooves of the outer race in order to roll on the wave grooves.

According to one aspect of the present invention, the sleeve is integrally formed with the input shaft.

According to the other aspect of the present invention, the first to third bearings are ball bearings, and the transmitting rod has a circular cross-section.

Preferably, a semi-spherical recess is formed on one side of each transmitting rod so that the corresponding ball is positioned in the recess.

Preferably, the same plurality of rollers are respectively provided between the third bearing and the transmitting rods, and a groove is formed on one side of each transmitting rod so that the corresponding roller is positioned in the groove.

Preferably, a pair of fourth bearings is provided between the outer race and the transmitting race, and the fourth bearings are respectively assembled around the first and second flanges of the transmitting race.

BRIEF DESCRIPTION OF THE DRAWINGS

The above and other objects and advantages of the present invention will get readily apparent with reference to the following detailed description when considered in conjunction with the accompanying drawings wherein.

DETAILED DESCRIPTION OF THE PREFERRED EMBODIMENT

Hereinafter, preferred embodiments of the present invention will be explained in detail with reference to the attached drawings.

Figure 1:
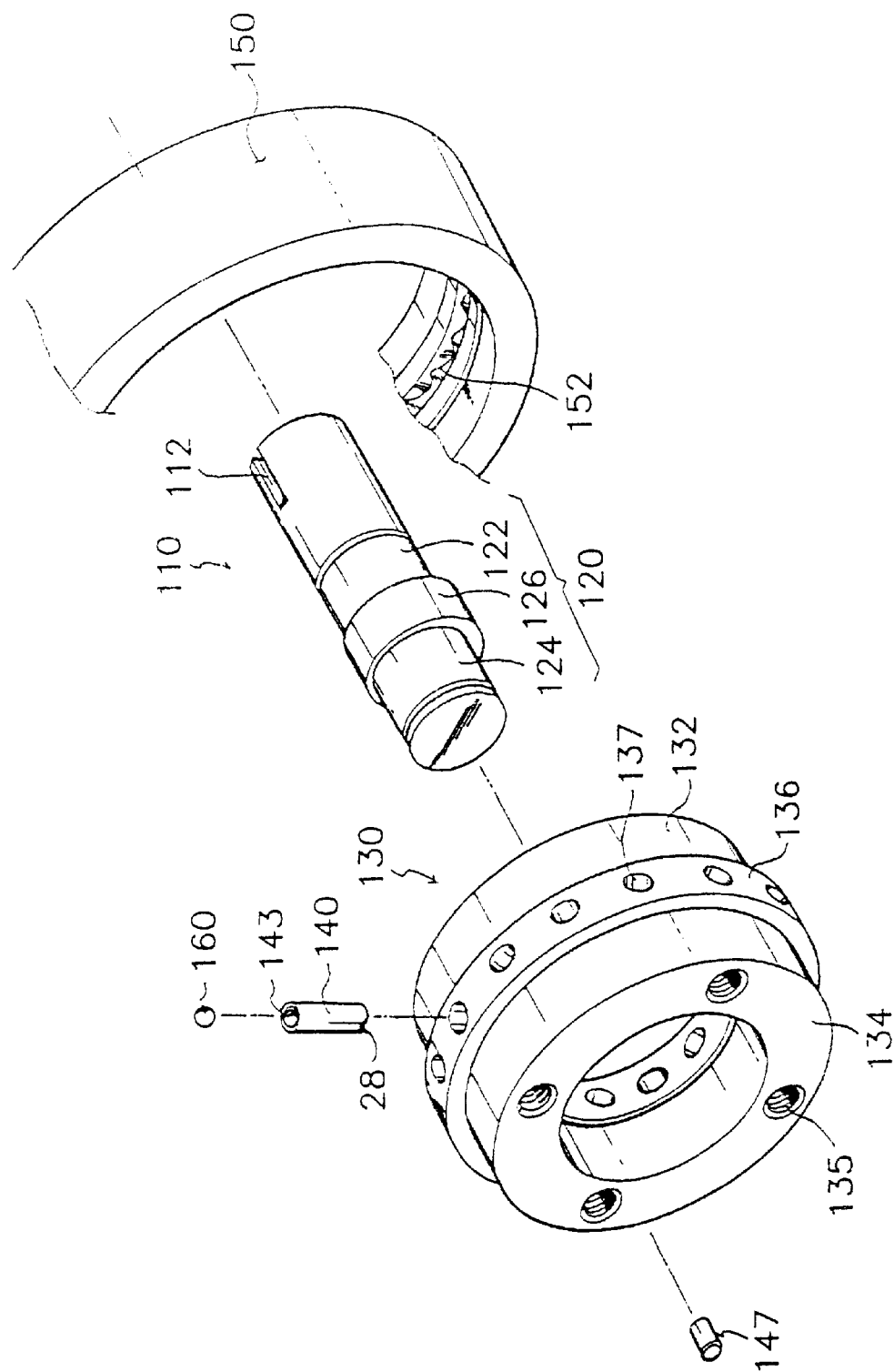
FIG. 1 is an exploded perspective view showing a transmitting unit according to a preferred embodiment of the present invention.
Figure 2:
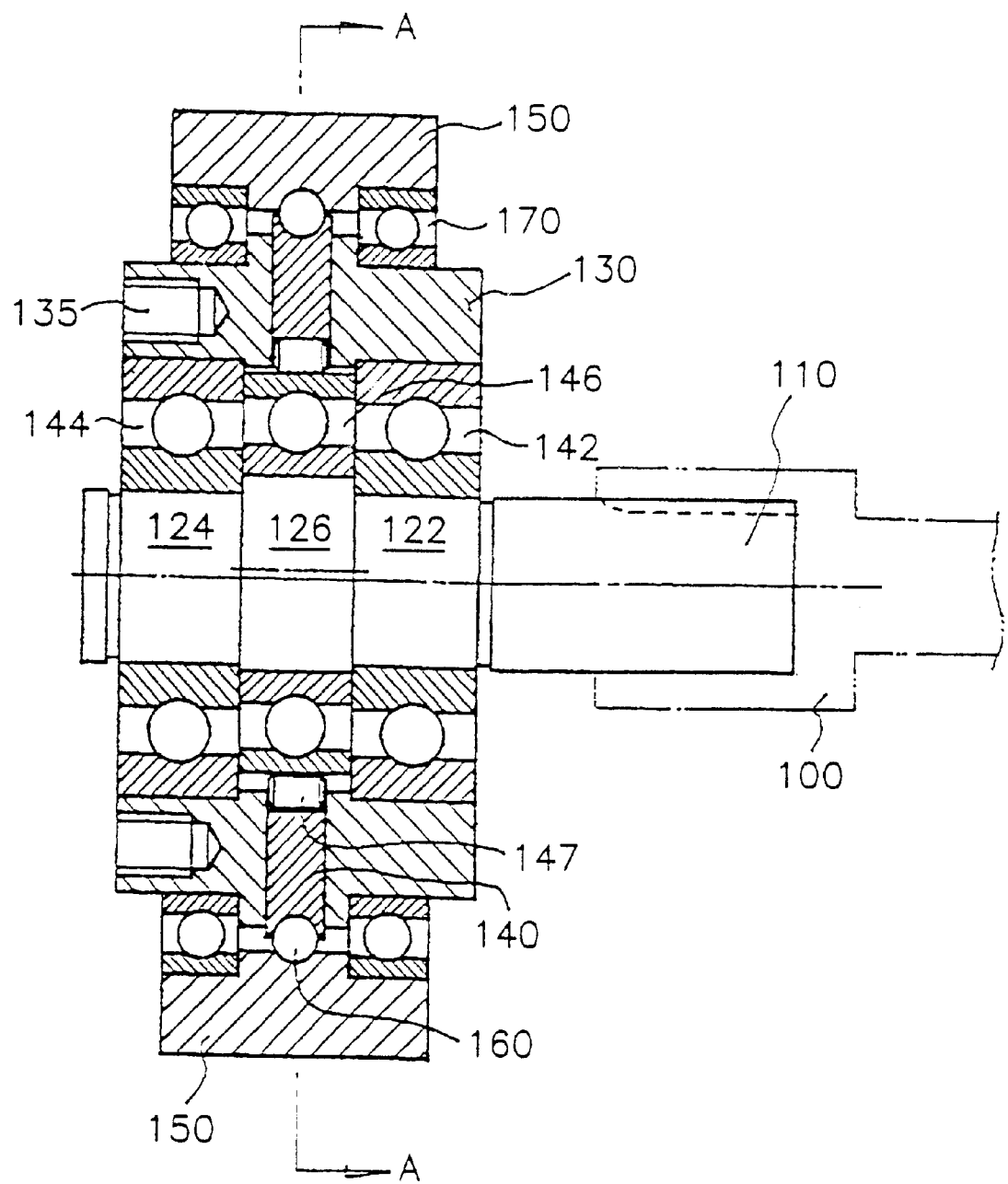
FIG. 2 is a cross-sectional view showing the transmitting unit according to the preferred embodiment of the present invention.
Figure 3:
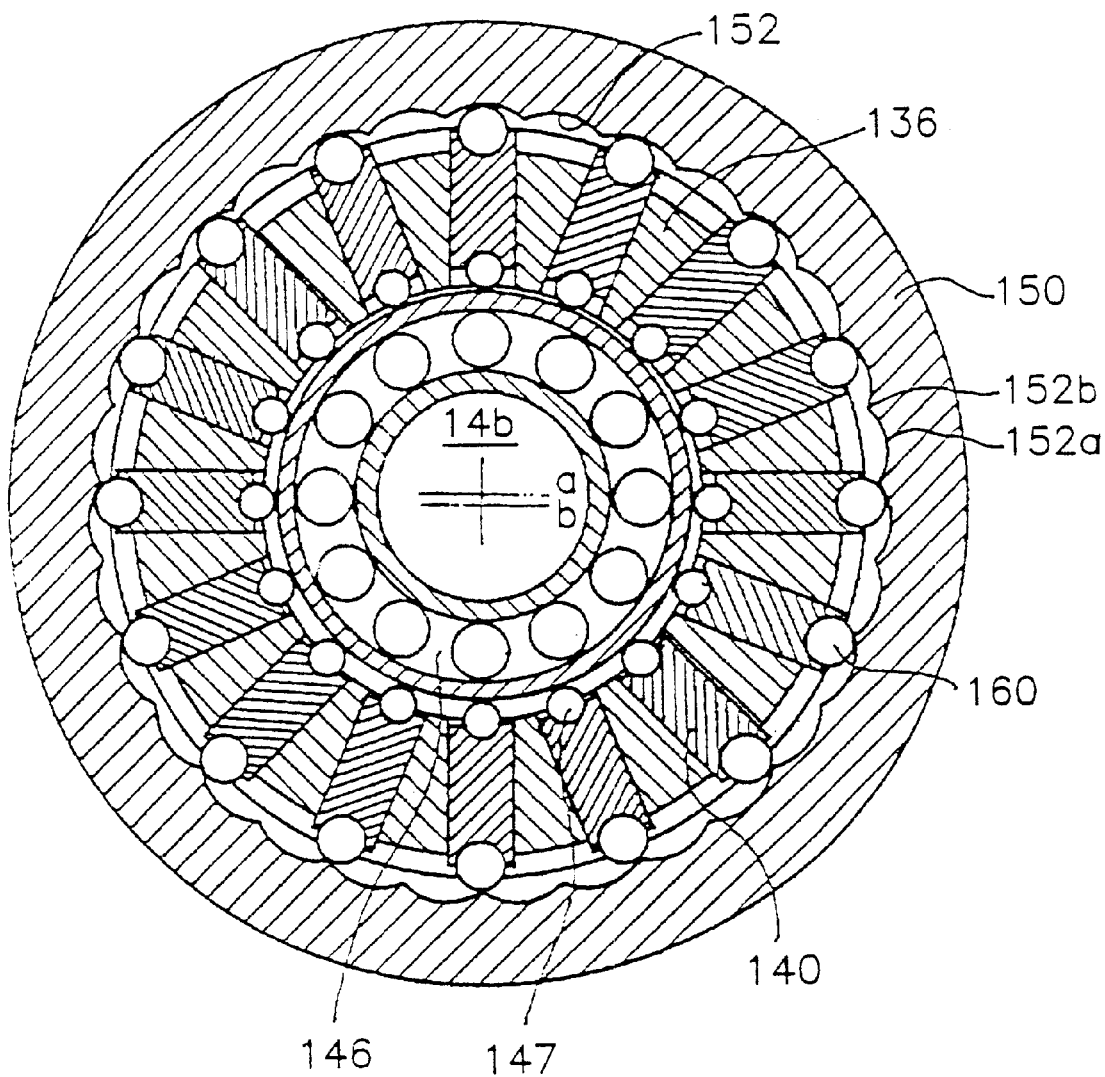
FIG. 3 is a cross-sectional view that is taken along the line A—A of FIG. 2.

FIG. 1 is an exploded perspective view showing a transmitting unit according to a preferred embodiment of the present invention. FIG. 2 is a cross-sectional view for showing the transmitting unit according to the preferred embodiment of the present invention, and FIG. 3 is a cross-sectional view that is taken along the line A—A of FIG. 2.

Referring to FIGS. 1 and 2, a transmitting unit according to a preferred embodiment of the present invention includes an input shaft 110 driven by a driving device 100, a transmitting race 130, and an outer race 150.

The input shaft 110 has a conventional key groove 112, and as shown in FIG. 2, the driving device 100 is assembled to the input shaft 110 by a key (not shown).

A sleeve 120 is integrally formed with the input shaft 110, and has a first concentric portion 122, a second concentric portion 124, and an eccentric portion 126. As shown in FIG. 1, the first and second concentric portions 122 and 124 and the eccentric portion 126 are integrally formed.

If the sleeve 120 is integrally formed with the input shaft 110 as in the present invention, a separate sleeve is not needed. Thus, the number of parts of the unit is decreased and the unit can be minimized.

A first bearing 142 is assembled along the outer periphery of the first concentric portion 122, and a second bearing 144 is assembled along the outer periphery of the second concentric portion 124. And, a third bearing 146 is assembled along the outer periphery of the eccentric portion.

The first and second bearings 142 and 144 support the third bearing 146, and reduce the frictional speed when the transmitting race 130. The third bearing 146 is eccentrically moved when the input shaft 100 is driven.

According to the present invention, ball bearings are used as the first to third bearings 142, 144, and 146 in a transmitting unit for light load, and ball bearing are used as the first and second bearings 142 and 144 and a roller bearing is used as the third bearing 146 in a transmitting unit for heavy load. But, roller bearings may be used as the first to third bearings 142, 144, and 146.

The integrally formed transmitting race 130 is installed on the outer peripheries of the first and second bearings 142, 144, and 146. The transmitting race 130 has a first flange 132, a second flange 134, and a third flange 136. According to an aspect of the present invention, the transmitting race 130 is integrally formed.

The first flange 132 surrounds the outer periphery of the first bearing 142, and the second flange 134 surrounds the outer periphery of the second bearing 144. The third flange 136 surrounds the third bearing, and is integrally formed with the first and second flanges 132 and 134. As shown in FIG. 1, the third flange 136 has a plurality of radial holes that are spaced apart by a predetermined distance.

Transmitting rods 140 are inserted into the radial holes 137 of the third flange 136 of the transmitting race 130, respectively. The transmitting rods 140 are movable in a radial direction in the radial holes 137, and have a circular cross-section.

As shown in FIG. 1, a plurality of engagement holes 135 are formed on the front surface of the second flange 134. An output shaft (not shown) is assembled to the engagement holes 135 by a flange-type engaging appliance (not shown).

The outer race 150 surrounds the outer periphery of the transmitting race 130, and has a plurality of wave grooves 152 on the inner periphery thereof, as shown in FIG. 3.

According to the preferred embodiment of the present invention, the wave grooves 152 are disposed in a row, but may be disposed in a pair of rows.

Balls 160 are provided between the transmitting rods 140 and the wave grooves 152 of the outer race 150 and roll on the wave groove 152. A semi-spherical recess 143 is formed on one side of each transmitting rod 140 so that the corresponding ball 160 is positioned in the recess 143.

According to the present invention, the balls 160 roll between the transmitting rods 140 and the outer race 150, which reduces the frictional forces, compared to the case rollers roll between them. On top of that, the balls can endure axial loads.

The wave groove 152 is designed such that the balls 160 make surface contact with the wave grooves 152 when rolling on the wave grooves 152. Therefore, the contact stress in the balls 160 during the operation of the unit is given out, and thus the lives of the balls are prolonged.

Rollers 147 are provided between the third bearing 146 and the transmitting rods 140 respectively, a groove 145 is formed on one side of each transmitting rod 140 so that the corresponding roller 147 is positioned in the groove 145.

The outer race 150 is integrally formed, and a pair of fourth bearings 170 are provided between the transmitting race 130 and the outer race 150. As shown in FIG. 2, the fourth bearings 170 are assembled around the first and second flanges 132 and 134 of the transmitting race 130. In the preferred embodiment of the present invention, ball bearings are used as the fourth bearings 170.

The fourth bearings 170 support the loads of the transmitting race 130 during the transmission on both sides of the transmitting race 130, and thus minimize the deformation of the input shaft 110. Therefore, the precision of the assembly maintained even during the operation of the unit, and the vibration and the noise are minimized.

Hereinafter, the operation of the above-mentioned transmitting unit will be explained with reference to FIGS. 2 and 3.

Firstly, after the input shaft 110 of the transmitting unit according to the present invention is assembled to the driving device 100, the driving force is transferred to the input shaft 110 from the driving device 100. When the driving force rotates the input shaft 110, the rotational force is transferred to the first to third bearings 142, 144, and 146.

When the input shaft 110 is rotated, the eccentric portion 126 of the sleeve 120 integrally formed with the input shaft 110 is rotated, moving between a and b of FIG. 3. Therefore, the driving force of the input shaft 110 and the rotational force of the eccentric portion 126 are transferred to the third bearing 146.

As mentioned above, the third bearing 146 is eccentrically rotated, and thus the transmitting rods 146 are reciprocated in the holes 137.

The ball 160 provided on one side of each transmitting rod 140 rolls along the wave groove 152 of the outer race 150, and simultaneously the transmitting rod 140 rotates the transmitting race 130.

Then, since the transmitting rods are symmetrical with reference to the central point of the input shaft 110, as shown in FIG. 3, when the ball 160 of the transmitting rod 140 which is located on the upper side of the unit is located at a highest point 152A of the wave groove 152, the ball 160 of the transmitting rod 140 which is located on the lower side of the unit is located at a lowest point 152B of the wave groove 152.

According to the operation of the unit, if the input shaft 110 is rotated, the output shaft (not shown) assembled to the transmitting race 130 is rotated at a reduced rotational speed.

As described above, the transmitting unit based on the present invention has an integrally formed transmitting race, an integrally formed outer race, and an input shaft in which an eccentric portion is integrally formed, without using a separate eccentric sleeve, and thereby the causes of the assembly tolerances are basically settled. Therefore, since the unit is precisely maintained, the operation of low vibration and low noise can be easily achieved. Furthermore, according to the unit of the present invention, the life of the unit becomes prolonged, and the strength of the unit is maintained. Since the number of parts becomes remarkably reduced, the manufacturing cost of the unit could be reduced.

As stated above, preferred embodiments of the present invention are shown and described. Although the preferred embodiments of the present invention have been described, it is clearly understood that the present invention should not be limited to these preferred embodiments but a variety of changes and modifications can be made by one skilled in the art within the spirit and scope of the present invention as hereinafter claimed.

What is claimed is:

1. A transmitting unit comprising:
    an input shaft driven by a driving device;
    a sleeve driven together with the input shaft when the input shaft is driven and having a first concentric portion, a second concentric portion, and an eccentric portion;
    a first bearing assembled along the outer periphery of the first concentric portion;
    a second bearing assembled along the outer periphery of the second concentric portion;
    a third bearing assembled along the outer periphery of the eccentric portion and eccentrically moving when the input shaft is driven;
    an integrally formed transmitting race having a first flange surrounding the outer periphery of the first bearing, a second flange surrounding the outer periphery of the second bearing, and a third flange surrounding the outer periphery of the third bearing and integrally formed with the first and second flanges, the third flange having a plurality of radial holes spaced apart by a predetermined distance;
    the same plurality of transmitting rods respectively inserted into the radial holes of the third flange of the transmitting race;
    an integrally formed outer race located outside the transmitting race and having a plurality of wave grooves on the inner periphery thereof;
    a pair of fourth bearings provided between the outer race and the transmitting race, the fourth bearings being respectively assembled around the first and second flanges of the transmitting race; and
    the same plurality of balls respectively provided between the transmitting rods and the wave grooves of the outer race so as to roll on the wave grooves.

2. A transmitting unit according to claim 1, wherein the sleeve is integrally formed with the input shaft.

3. A transmitting unit according to claim 1, wherein the first to third bearings are ball bearings.

4. A transmitting unit according to claim 1, wherein the transmitting rod has a circular cross-section.

5. A transmitting unit according to claim 1, wherein a semi-spherical recess is formed on one side of each transmitting rod so that the corresponding ball is positioned in the recess.

6. A transmitting unit according to claim 1, wherein the same plurality of rollers are respectively provided between the third bearing and the transmitting rods, and a groove is formed on one side of each transmitting rod so that the corresponding roller is positioned in the groove.

7. A transmitting unit according to claim 1, wherein the fourth bearings are ball bearings.

8. A transmitting unit according to claim 1, wherein the wave grooves are disposed in a row.

9. A transmitting unit according to claim 1, wherein the balls make surface contact with the wave grooves while rolling on the wave grooves.

* * * * *